June 20, 1933.  G. H. B. WEST  1,914,904

TERMINAL POST SEALING STRUCTURE

Filed July 23, 1932

INVENTOR
George H. B. West
BY
Augustus B. Stoughton
ATTORNEY.

WITNESS:

Patented June 20, 1933

1,914,904

UNITED STATES PATENT OFFICE

GEORGE H. B. WEST, OF PHILADELPHIA, PENNSYLVANIA

TERMINAL POST SEALING STRUCTURE

Application filed July 23, 1932. Serial No. 624,177.

The object of my invention is to minimize the effect of corrosion on the surface of the terminal post of a storage battery where it passes through the cover of the cell. This corrosion is likely to take place due to the electrolytic action of current leading from the post surface into a film of liquid on the surfaces of the post and the cover. The under surface of the cover is usually continuous between the positive and negative terminals of the battery and a spray of electrolyte produced during the gassing period of charge covers this surface. The electrolytic action occurs during the periods of high voltage applied to the cell terminals while the battery is on charge. It is found that such corrosion takes place more actively in a confined or even in a capillary space such as is usually present around the post where it passes through the cover if this space is almost entirely shut off from the interior of the cell. The tendency to such corrosion is minimized by access of the stronger electrolyte of the cell to the exposed surfaces. My improved device is designed to allow the electrolyte of the cell to have comparatively free access to the surfaces between the terminal post and the cover where this tendency to corrosion usually appears. At the same time a seal is provided around the post above the cover to prevent the electrolyte from spreading over the upper surface of the cover.

For a further exposition of my invention reference may be had to the annexed drawing and specification at the end whereof my invention will be specifically pointed out and claimed.

Figure 1:
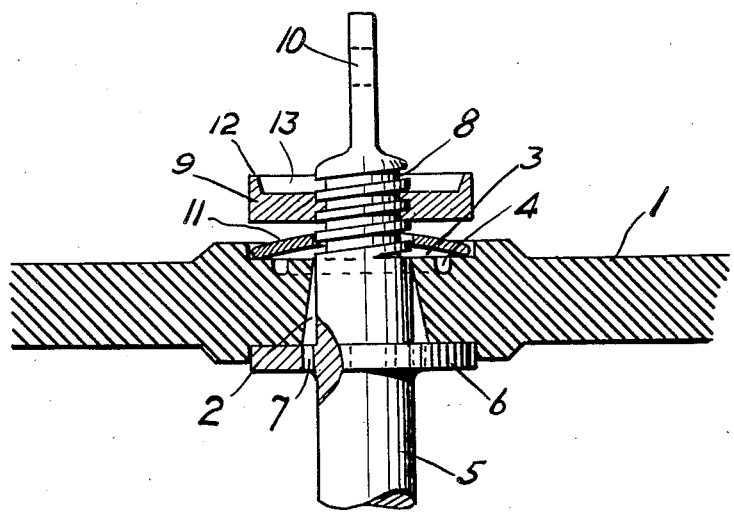
Figure 1 is a vertical cross section through the structure with parts in side elevation and broken away.
Figure 2:
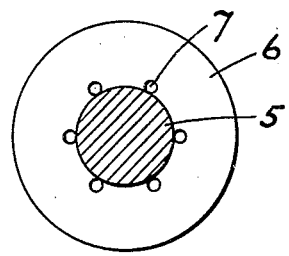
Figure 2 is a horizontal cross section through the terminal post above the flange.

For the purposes of illustration the structure is shown as consisting of a closure or cover 1 suitable to close the top of a storage battery. Closure 1 has an aperture 2 of upright frustroconical shape passing through it. Surrounding aperture 2 on the upper surface of cover 1 is a recess 3 provided with a groove 4 adapted to receive grease in it.

A cylindrical terminal post 5 passes through aperture 1 and carries a flange 6 having a plurality of ducts 7 therein communicating at one end with the clearance space 2 and at the other other end with the interior of the storage battery cell. Flange 6 fits into a recess in the under side of cover 1. Above the cover 1, post 5 is provided with screw threads or other fastening means 8 for receiving a seal nut 9. Above this, post 5 has a flattened portion having a hole 10 drilled therein for bolting on a terminal conductor (not shown).

Surrounding post 5 under seal nut 9 is a cup shaped washer 11, which may be dipped in grease and which fits inside of the recess 3 in the cover and outside of the groove 4. When seal nut 9 is screwed down into place, the cupped washer 11 flattens out, confining the grease in the groove 4, thus providing an insulating barrier to prevent creepage of the electrolyte out over the upper surface of the cover 1. Seal nut 9 has an upstanding rim 12 providing a channel 13 to receive grease adapted to prevent the creepage of electrolyte up the post 5.

Post 5 provides a clearance space 2 between the post and the cover 1 except at the top where the post may be a fairly close fit in the cover although this is not necessary. When the seal nut 9 is screwed down it clamps the cover 1 against the flange 6.

One of the advantages of the structure herein described lies in the fact that the weight of the battery plates supported in the cell by the terminal post tends to maintain the seal between the post and the upper surface of the cover.

I do not intend to be limited in the practice of my invention save as the scope of the prior art and of the attached claims may require.

I claim:

1. A terminal post sealing structure for a storage battery cell including in combination: a closure for said cell having an aperture therein, a terminal post extending through said aperture and providing a clearance space between the wall of said aperture and the surface of said post, a flange on said post bearing against the under side of said closure and provided with ducts communicating with said clearance space and with the interior of said cell, and means cooperating with said post above said closure and adapted to clamp said closure between said means and said flange to form a seal between said post and said closure.

2. A terminal post sealing structure for a storage battery cell, including in combination: a closure for said cell having an aperture of upright frusto-conical shape therein, a terminal post in said aperture providing a clearance space between the wall of said aperture and the surface of said post, a flange on said post bearing against the under side of said closure and having ducts therein communicating with said clearance space and with the interior of said cell, a cupped washer on the upper surface of said closure surrounding said post, and a seal nut cooperating with said post and bearing against said washer to clamp said closure between said washer and said flange to provide a seal between said closure and said post above said clearance space.

3. A terminal post sealing structure for a storage battery cell, including in combination: a closure for said cell having an aperture therein of upright frusto-conical shape, a terminal post projecting through said aperture and providing a clearance space between the surface of said post and the wall of said aperture, a flange on said terminal post supporting said cover and having ducts therein communicating with said clearance space and with the interior of said cell, said closure having at its upper surface a recess and a groove surrounding said aperture, a cupped shape washer on the upper surface of said closure within said recess and surrounding said groove, and a seal nut on said post adapted to flatten said washer and to thereby clamp said closure between said flange and said washer.

GEORGE H. B. WEST.